United States Patent [19]
Ryles

[11] Patent Number: 5,709,169
[45] Date of Patent: Jan. 20, 1998

[54] ANIMAL FEEDING APPARATUS

[76] Inventor: Louis Ryles, 119 Commodore Drive, Paradise Waters Qld, Australia

[21] Appl. No.: 676,343
[22] PCT Filed: Jan. 23, 1995
[86] PCT No.: PCT/AU95/00028
 § 371 Date: Jul. 19, 1996
 § 102(e) Date: Jul. 19, 1996
[87] PCT Pub. No.: WO95/19700
 PCT Pub. Date: Jul. 27, 1995

[30] Foreign Application Priority Data

Jan. 21, 1994 [AU] Australia .................. PM 3481
Jan. 24, 1994 [AU] Australia .................. PM 4646

[51] Int. Cl.⁶ ........................................... A01K 5/01
[52] U.S. Cl. ................................................. 119/62
[58] Field of Search ........................ 119/62, 55, 61, 119/51.01, 54, 53.5

[56] References Cited

U.S. PATENT DOCUMENTS 3,121,419  2/1964  Gillespie ..................... 119/61
4,793,290 12/1988  O'Donnell ................. 119/55 X

FOREIGN PATENT DOCUMENTS

| | | |
|---|---|---|
| 100607 | 3/1936 | Australia . |
| 220832 | 10/1957 | Australia . |
| 28417/89 | 1/1990 | Australia . |
| 83238/91 | 3/1992 | Australia . |
| 2507776 | 12/1982 | France . |
| 3440462 | 5/1986 | Germany . |
| 2198026 | 6/1988 | United Kingdom . |
| 2262697 | 6/1993 | United Kingdom . |

*Primary Examiner*—Thomas Price
*Attorney, Agent, or Firm*—Shoemaker and Mattare, Ltd.

[57] ABSTRACT

A feeding apparatus for animals, such as dogs or cats, has an inclined platform and a hingedly connected lid which seats on the upper surface of a food container to close the container. When a weight is applied to the platform such as when an animal stands upon the platform, the lid pivots to an open position as the platform moves downwardly to provide access to the contents of the container.

9 Claims, 4 Drawing Sheets

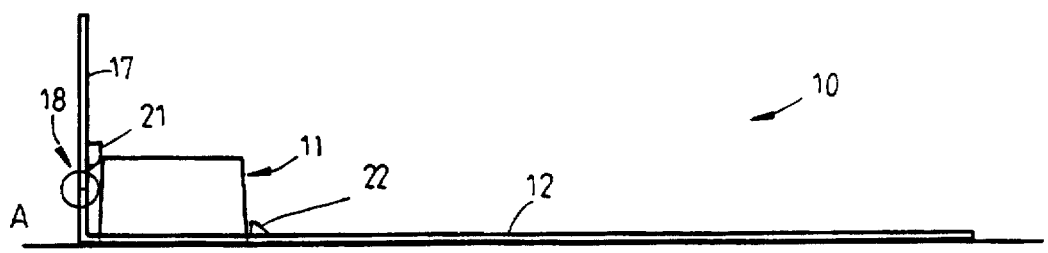
FIG.6
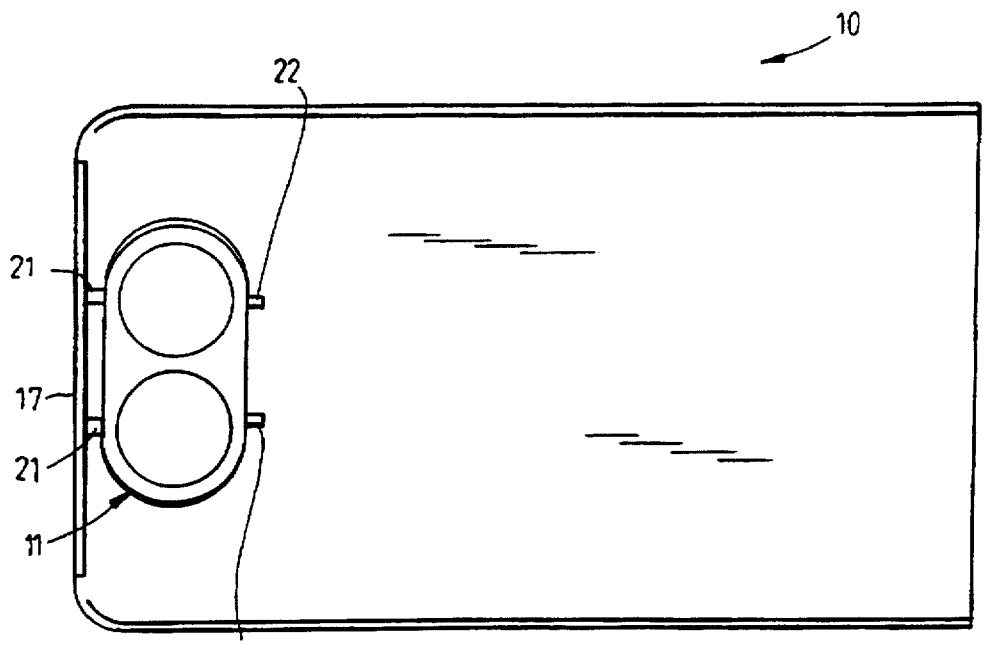
FIG.7
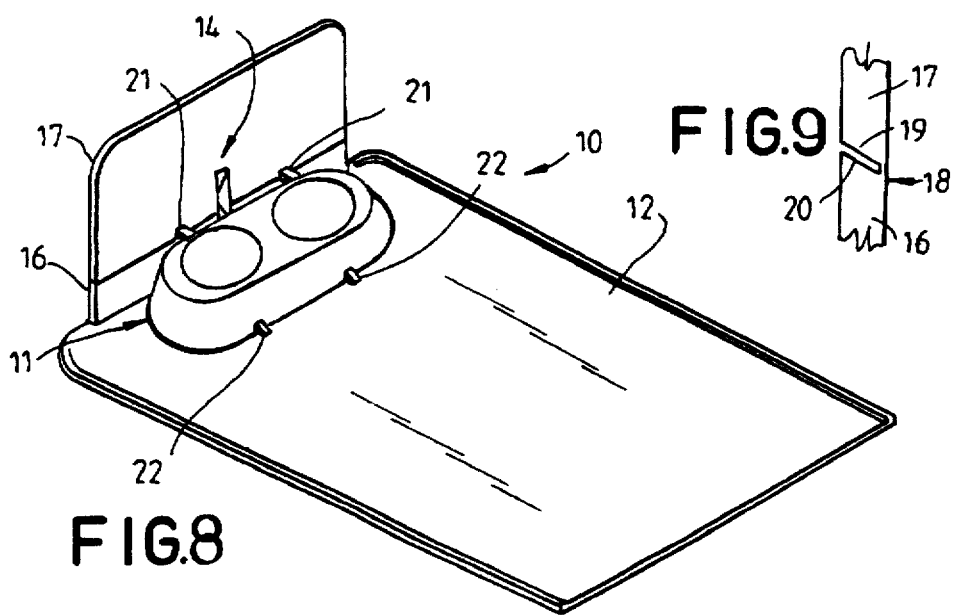
FIG.8
FIG.9

ANIMAL FEEDING APPARATUS

TECHNICAL FIELD

This invention relates to feeding apparatus and in particular to feeding apparatus for domestic dogs and cats.

BACKGROUND ART

The feeding devices used for feeding dogs and cats generally comprise open bowls into which the food is placed and then given to the cat or dog. Such bowls are not particularly hygienic as flies, ants and other vermin tend to be attracted to the food within the bowl. Additionally, the food if left for a period of time tends to deteriorate and thereby become inedible. Some devices have been made in order to alleviate the above problems, however, generally the currently known devices have not been particularly effective. For example, one animal feeding bowl incorporates an external moat which may be filled with water to prevent access of ants to the food within the bowl. This bowl has limited effectiveness and of course does not prevent deterioration of the food. A further feeding device is available which has a number of compartments, each of which may contain animal food and which is closed by a plate having an opening therein which is indexed daily by a mechanism so that respective compartments are accessible through the opening in a plate. This device has also not proved to be particularly effective and does not prevent vermin access to the food as the food in each compartment in turn is left exposed through the opening in the plate.

DISCLOSURE OF THE INVENTION

The present invention aims to provide an improved feeding apparatus which allows animals such as dogs and cats to have ready access to food and/or water but which prevents or minimizes the risks of vermin access to the food when the apparatus is not in use. The present invention further aims in a preferred aspect to provide feeding apparatus which may be used with currently available food containers or with commercial containers such as tins in which food is supplied and thereafter discarded. The present invention further aims in a preferred aspect to provide feeding apparatus which minimizes deterioration of the food and maintains the food in a fresh state. Other objects and advantages of the invention will become apparent from the following description.

The present invention thus provides feeding apparatus adapted to be associated with an open topped food or water container, said feeding apparatus includes platform means, closure means associated with said platform means and adapted to normally close said container, said closure means being opened to provide access to said container when said platform means is subject to the weight of an animal thereupon.

Preferably the platform means is in a normally raised or inclined attitude and biasing means are provided to maintain the platform in its raised or inclined attitude when a weight or load is not applied thereto. The biasing means is such as to return the platform to its raised or inclined position when the weight or load is removed therefrom so that the closure means closes the container. The biasing means in one form comprises spring means associated with the closure means. Alternatively, the biasing means may be associated with the platform means and may comprise a spring. The spring in this form may comprise a leaf-like spring. The platform means includes at least one opening into which the container may be freely inserted to be supported on an underlying surface such as a ground or floor surface and so that the container extends above the platform means. In one form, the platform means may be provided with a pair of such openings to receive a pair of food bowls or containers.

The opening or openings for receiving the containers are, where an inclined platform means is used, located adjacent the normally upper end of the platform means.

The closure means preferably is in the form of a lid which normally seats upon the rim about the upper open end of the container so as to prevent access to the contents thereof. Preferably the lid is hingedly connected to the platform so as to hingedly move between its open and closed position. In its open position the lid is preferably in a generally vertical attitude so as to allow full access to the feed container. The lid may be provided on its underside with a camming member or members which co-operates with the rim or rims of the feed bowl or bowls so as to enable the lid to be fully opened when weight is applied to the platform means.

The hinge connected between the lid and platform preferably comprises integrally formed hinge means. The spring means is also preferably integrally formed with the lid and/or platform means or may be a separate spring element or elements.

BRIEF DESCRIPTION OF THE DRAWINGS

In order that the invention may be more readily understood and put into practical effect, reference will now be made to the accompanying drawings which illustrate a preferred embodiment of the invention and wherein:

FIGS. 6, 7 and 8 illustrate in side view, plan view and perspective view the feeding apparatus of the invention in an attitude providing access to the feed bowl;

FIG. 9 is an enlarged view of the region A of FIG. 6;

BEST MODE FOR CARRYING OUT THE INVENTION

Figure 1:
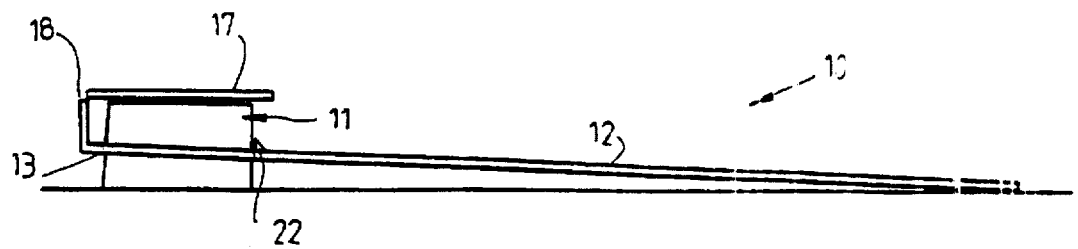
FIGS. 1, 2 and 3 illustrate in side view, plan view and perspective view feeding apparatus according to the present invention in an attitude preventing access to the feed bowl.
Figure 2:
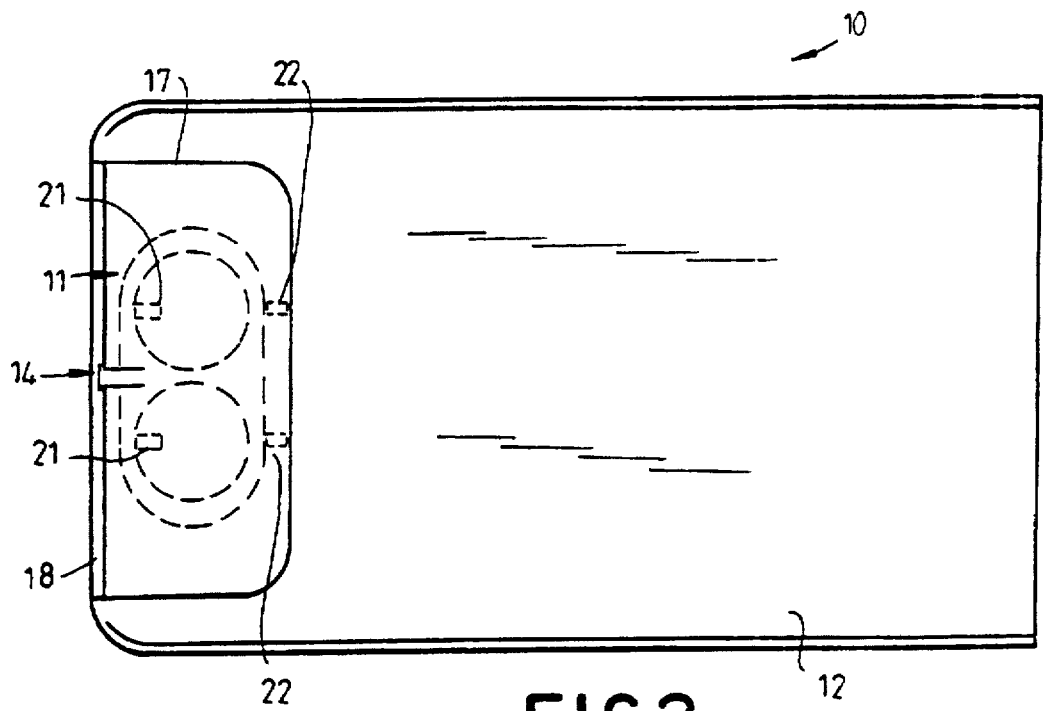
Figure 3:
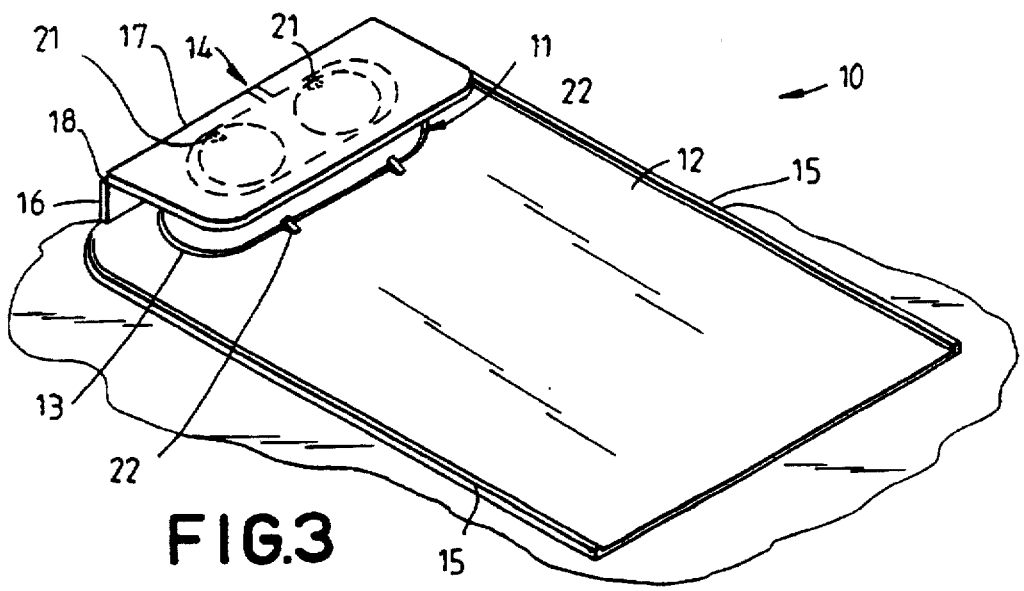

Referring to the drawings and firstly to FIGS. 1 to 3, there is illustrated feeding apparatus 10 according to the present invention adapted for use with a food bowl 11 which in this instance comprise an open topped twin bowl container but which may comprise cans in which pet food is supplied and which have their lid removed or any other open topped container. The apparatus 10 includes a platform 12 of generally planar form and having at one end one or more openings or apertures 13 of a size to freely receive the container 11 therethrough so that the latter may seat on an underlying ground or floor surface and extend above the platform 12. The platform 12 is normally disposed in an inclined attitude resting on the ground or floor surface at one end. The platform 12 may be stiffened along opposite sides by respective flanges or ribs 15.

The platform 12 terminates in an upwardly extending end wall 16 arranged adjacent the aperture 13. A closure member in the form of a planar lid 17 is hingedly connected to the upper edge of the end wall 16 by means of a integrally formed hinge 18 or alternatively by a separate hinge. Preferably the hinge 18 is such as to prevent the lid 17 opening beyond vertically. For this purpose and as shown in FIG. 9 respective opposed end surfaces 19 and 20 of the lid 17 and end wall 16 are arranged to abut each other to prevent movement of the lid 17 beyond vertical. In an alternative arrangement a separate stop may be used for this purpose. The lid 17 is also provided on its underside with a pair of spaced apart lugs 21 which act as camming members for co-operation with the container 11 as described further below. A further pair of upstanding lugs 22 may be provided on the platform 12 adjacent the opening 13 on their side opposite the wall 16 to stabilise the container 11 in use again as described further below.

Figure 4:
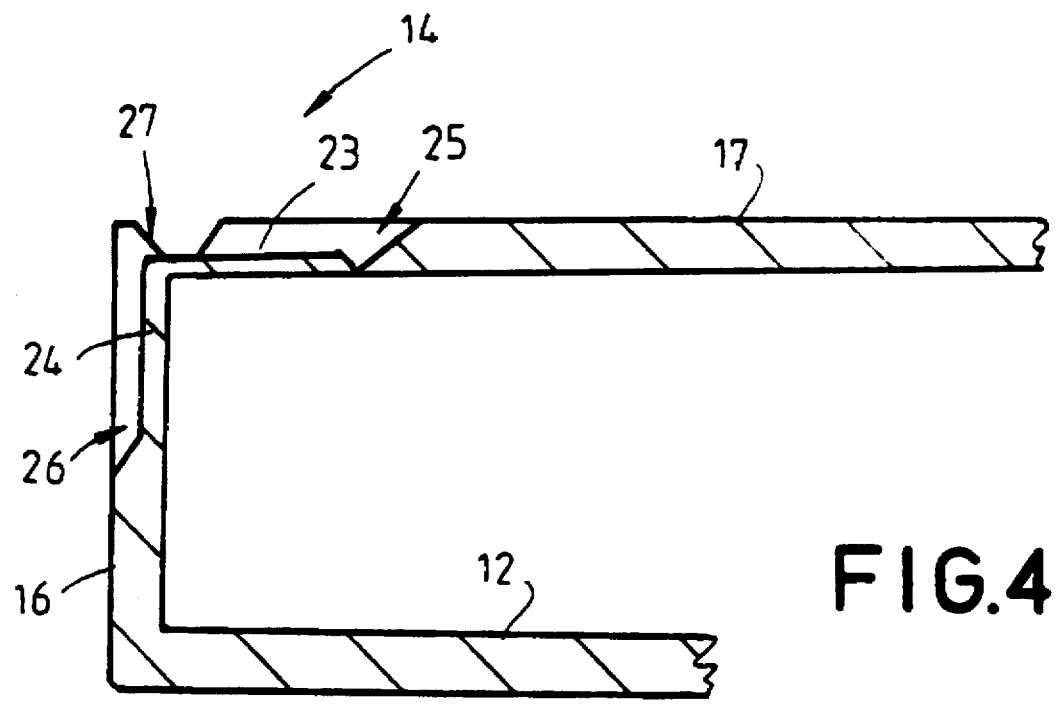
FIG. 4 is a sectional view illustrating the biasing means of the lid of the apparatus.
Figure 5:
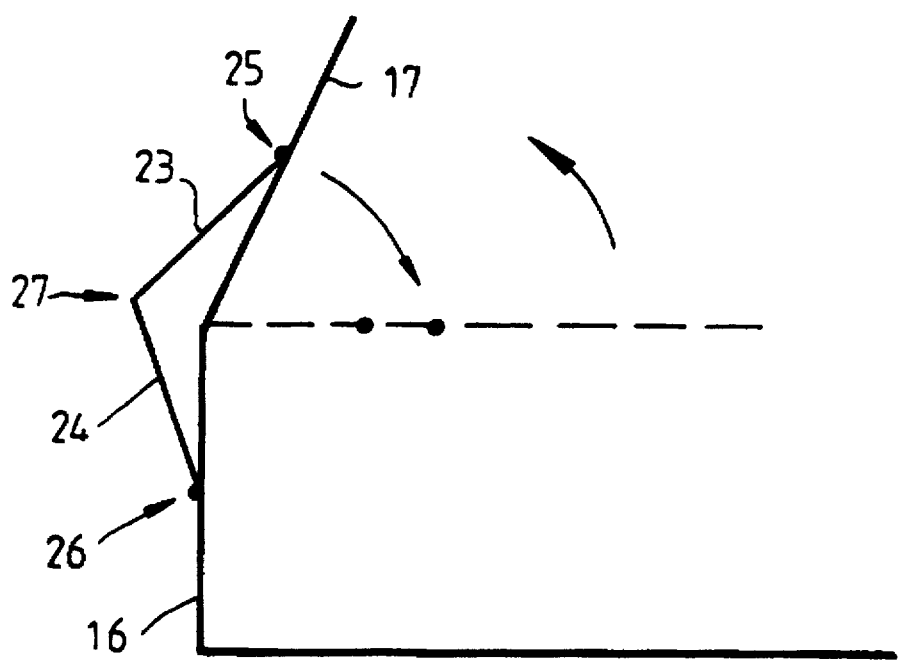
FIG. 5 illustrates schematically the biasing means with the lid raised.

Biasing means 14 are provided between the lid 17 and wall 16 to urge the lid 17 towards the horizontal attitude shown. The biasing means 14 is suitably integrally formed and may include a pair of integrally and somewhat rigidly connected elements 23 and 24. The elements 23 and 24 are leaf-like element, the element 23 being integrally formed and hingedly connected with the lid at 25 and the element 24 being integrally formed and connected with the end wall 16 at 26. The elements 23 and 24 are integrally connected at 27. In the lowered position the elements 23 and 24 are substantially at right angles to each other as shown in FIG. 4. As the lid 17 is raised as shown in FIG. 5, the spring elements 23 and 24 are moved outwardly and forced or bent away from each other and the element 24 forced or bent away from the end wall thus creating a biasing force at the joints 26 and 27. If the lid 17 is released, the biasing force at the joints 26 and 27 will urge the lids 17 towards the closed position of FIG. 4.

In the position of FIGS. 1 to 3, the biasing means 14 urges the lid 17 to a substantially horizontal attitude where it seats upon the upper rim of the container 11 so as to close the container 11 and prevent access to the contents thereof. The engagement of the lid 17 with the upper rim of the container 17 will maintain the adjacent end of the platform 12 elevated and in an inclined attitude. When a weight is applied to the platform 12 to oppose the biasing means 14, such as when an animal walks upon the platform 12, the platform 12 will move downwardly against the force of the biasing means 14 to the position of FIGS. 4 to 6. This downward movement will also force the lid 17 open through co-operation between the lid 17 and rim or upper edge of the container 11. Thus, as the platform 12 is forced downwardly, so will the end wall 16 and the lid 17. The container 11 will remain in a fixed position and, engaging the lid 17, will cause pivotal Opening movement of the lid 17 about the hinge 18 and against the bias of the biasing means 14. As the lid 17 pivots upwardly, the rear edge of the container 11 will slide relatively along the underside of the lid 17 until the camming lugs 21 are reached, the latter co-operating with the rear edge of the container 11 to urge the lid 17 to the substantially vertical attitude shown when the platform 12 is in a substantially horizontal attitude on the underlying surface. The co-operating surfaces 19 and 20 (see FIG. 9) prevent the lid moving substantially beyond vertical. This motion also tends to apply a sideways force to the containers 11, however, this force is resisted by the lugs 22 on the platform 12 so that the container 11 remain stable. The animal thus has access to the contents of the containers 11.

When feeding has finished and the animal walks off the platform 12 so that weight is removed from the platform 12, the biasing means 14 will return the platform 12 to the inclined position of FIGS. 1 to 3. This occurs as the lid 17 again pivots about its hinge 18 to a substantially horizontal position seating on the rims of the container 11 and therefore closing same as shown in FIGS. 1 to 3.

The apparatus 10 thus will maintain the contents of the container 11 substantially sealed and in a fresh state when food is not being consumed. Additionally, as access to the container 11 is closed by the lid 17, problems with vermin are substantially reduced.

Figure 10:
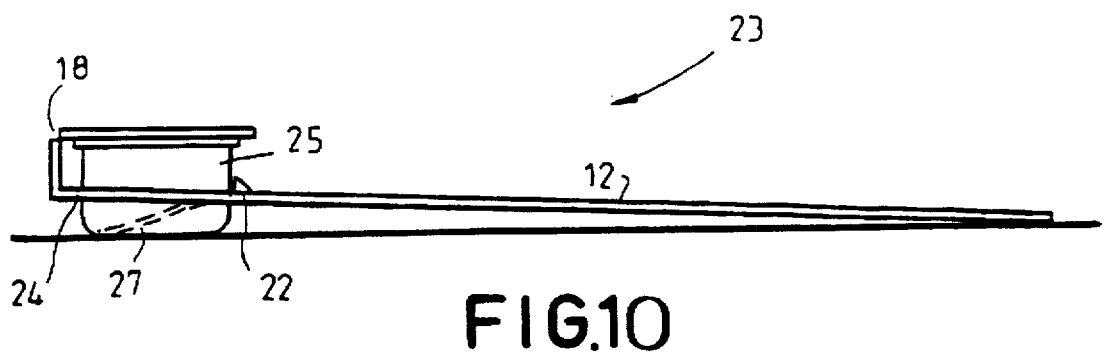
FIG. 10 is a side view of an alternative embodiment of the invention in a closed attitude.
Figure 11:
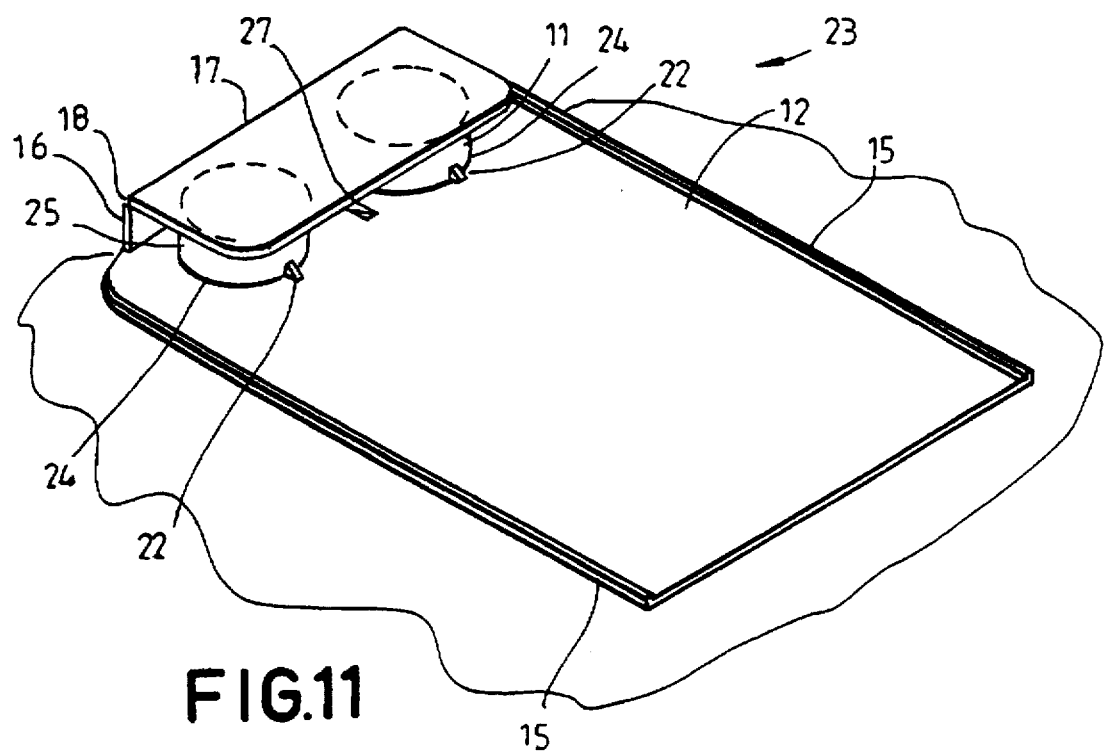
FIG. 11 is a perspective view of the embodiment of FIG. 10.

FIGS. 10 and 11 illustrate an alternative embodiment of feeding apparatus 28 according to the invention which is similar to the embodiment of FIGS. 1 to 9 and in which like components have been given like numerals. The apparatus 28 thus includes a platform 12 terminating in an upwardly extending end wall 16 which pivotally supports a lid 17 through a hinge 18 of similar form to that shown in FIG. 9. In this embodiment however, the platform 12 is provided with a pair of spaced apart openings 29 adjacent the end wall 16 through which respective containers 30 may project, the containers 30 being supported on the ground or a floor 31 and extending upwardly through the openings 29.

A spring element 32 which may be integrally formed with the platform 12 is located between the openings 29 and projects downwardly to contact the ground or floor 31 and bias the end of the platform 12 upwardly. In this attitude, the lid 17 seats on the upper rims of the containers 30 to close same. As with the apparatus 10 of FIGS. 1 to 9, the platform 12 is provided with lugs 22 to hold the containers 30 in position and lugs 21 on the underside of the lid 17 arranged to cooperate with the containers 30 to effect full opening of the lid 17.

Figure 12:
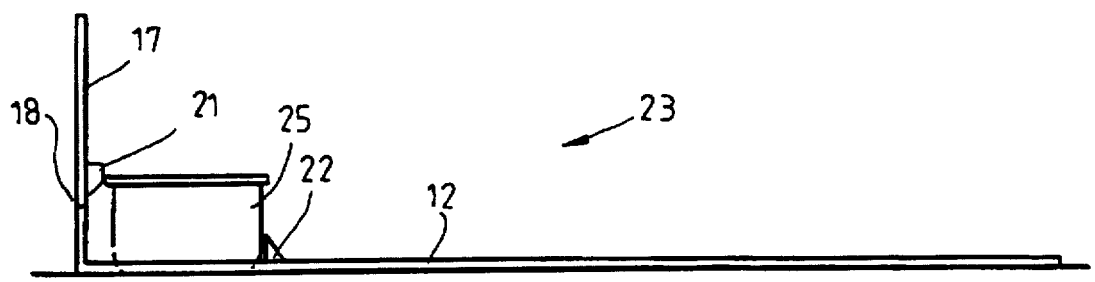
FIG. 12 illustrates the embodiment of FIG. 10 in an open attitude.

In the position of FIGS. 10 and 11 the spring element 32 biases the platform 12 to a normally inclined attitude so that the lid 17 is disposed substantially horizontally and seats upon the upper rims of the containers 30 so as to close the containers 30 and prevent access to the contents thereof. When a weight is applied to the platform 12 to oppose the force of the spring 14, such as when an animal walks upon the platform 12, the platform 12 will move downwardly against the force of the spring element 14 and relatively to the containers 30 to the position of FIG. 12. This downward movement will force the lid 17 open through co-operation between the lid 17 and rims of the containers 30. Thus, as the platform 12 is forced downwardly, so will the end wall 16 and the lid 17. The containers 30 will remain in a fixed position and, engaging the lid 17, will cause pivotal opening movement of the lid 17 about the hinge 18. As the lid 17 pivots upwardly, the rims of the containers 25 will slide relatively along the underside of the lid 17 until the camming lugs 21 are reached, the latter co-operating with the rims of the containers 30 to urge the lid 17 to the substantially horizontal attitude shown when the platform 12 is in a substantially longitudinal attitude on the underlying surface 31. The co-operating surfaces 19 and 20 (see FIG. 9) prevent the lid 17 moving substantially beyond vertical and the lugs 22 cooperate with the containers 30 to ensure that they remain stable.

When feeding has finished and the animal walks off the platform 12 so that weight is moved from the platform 12, the spring element 14 will return the platform 12 to the inclined position of FIGS. 10 and 11 during which movement the lid 17 again pivots about its hinge 18 to a horizontal position seating on the rims of the containers 30 and therefore closing same.

The apparatus described above includes a platform of inclined form, however, the platform may be supported in a horizontal attitude and raise or lower when subject to a load or when a load is removed. Such a platform may be supported on spaced resilient elements such as springs. A similar action as described above is employed in such an arrangement to open and close food containers.

The biasing means 14 may comprise a separate spring element such as a leaf element on one of the hinged members which co-operates with a lug on the other hinged member so that when the lid is opened to apply a biasing force to the lid. The spring means 32 of the embodiment of FIGS. 10 to 12 may comprise in an alternative arrangement, a coil spring or spring or other resilient element such as a pad of resiliently compressible material.

The apparatus 10 and 28 are preferably formed of a plastics material as a moulding with all parts integrally formed, including the biasing means 14 or spring 32.

As stated above the apparatus 28 is particularly but not exclusively suited for use with containers of the type in which pet food is supplied. Such containers may then simply be discarded after use so that bowls are not required to be washed.

The containers of either embodiment may contain any suitably food, such as dog or cat biscuits or meat. Alternatively, the containers may contain water.

The underside of the lid 17 may, if desired be provided with a sealing pad, such as a rubber material to increase the sealing of the containers in the closed position. The stops 22 may in some situations be eliminated or alternatively may be replaced by an annular rib about the opening 13 or openings 29 to provide support to the container 11 or containers 30.

It will be found that domestic animals may be easily trained to walk onto the platform 12 or place their paws thereon to actuate the apparatus 10 to provide access to the food in the container. The apparatus may be used to provide food for animals over an extended period as the lid 17 when closed on the containers 11 will maintain the contents thereof fresh for some time.

Whilst the above has been given by way of illustrative embodiment of the invention, all such modifications and variations thereto as would be apparent to persons skilled in the art are deemed to fall within the broad scope and ambit of the invention as herein defined in the appended claims.

I claim:
1. Feeding apparatus comprising a platform having an opening at one end thereof adapted to pass over an open topped food or water container supported on a surface,
   closure means for said open topped food or water container hinged to said platform means adjacent said aperture, and
   biasing means adapted to suspend said one end of the platform when said closure means is closed over said container,
   said closure means being opened to provide access to said container when said platform end is depressed by the weight of an animal upon said platform against said bias by engagement of the closure means with the rim of said container.

2. Feeding apparatus according to claim 1 wherein said platform means is provided with a pair of said openings to receive a pair of said containers.

3. Feeding apparatus according to claim 1 wherein said lid in said open position is in a generally vertical attitude so as to allow full access to the interior of said container.

4. Feeding apparatus according to claim 1 wherein said container has a upper rim and wherein said lid includes on its underside with a camming member adapted to co-operates with said rim of said container to urge said lid to a fully opened attitude.

5. Feeding apparatus according to claim 1 wherein said hinge means comprises integrally formed hinge means.

6. Feeding apparatus according to claim 1 wherein said biasing means is integrally connected to said closure means and said platform.

7. Feeding apparatus according to claim 1, wherein said biasing means includes spring means acting between said means and said underlying surface to urge said platform means to an inclined attitude and wherein said closure is biased towards its container closing position by gravity.

8. Feeding apparatus according to claim 1, wherein said closure is biased towards its container closing position by said biasing means operating about the hinged connection between said platform and said closure.

9. Feeding apparatus according to claim 1, wherein said platform end is suspended whereby the upper rim of said container is elevated above the platform, the closure being hinged to a stand-off portion thereof.

* * * * *